July 26, 1955   E. J. SOENKSEN   2,713,917
DRIVE-STEERING CONTROL HANDLE FOR POWER MOWERS
Filed Dec. 24, 1953   3 Sheets-Sheet 1

Edwin J. Soenksen
INVENTOR.

BY
Attorneys

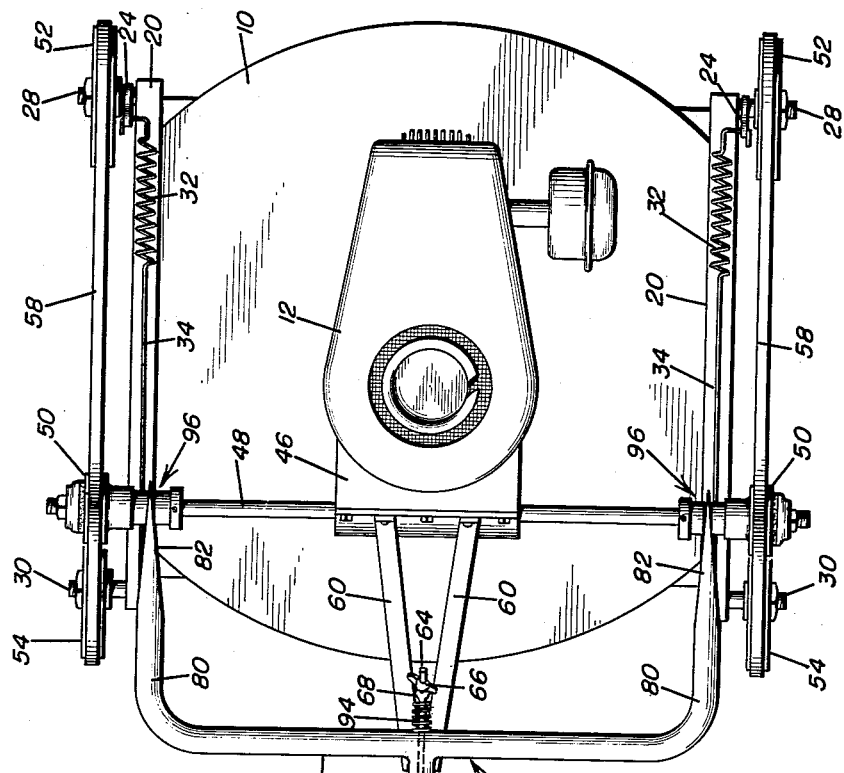
Fig. 4
Edwin J. Soenksen
INVENTOR.
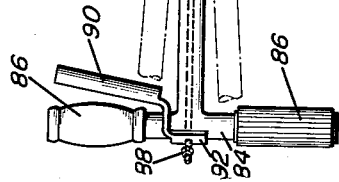

July 26, 1955  E. J. SOENKSEN  2,713,917
DRIVE-STEERING CONTROL HANDLE FOR POWER MOWERS
Filed Dec. 24, 1953  3 Sheets-Sheet 3

*Edwin J. Soenksen*
INVENTOR.

United States Patent Office 2,713,917
Patented July 26, 1955

2,713,917

DRIVE-STEERING CONTROL HANDLE FOR POWER MOWERS

Edwin J. Soenksen, De Witt, Iowa

Application December 24, 1953, Serial No. 400,300

6 Claims. (Cl. 180—6.2)

This invention relates in general to improvements in power mowers, and more specifically to an improved drive means for a power mower.

The primary object of this invention is to provide an improved drive means for a power mower which may be remotely controlled from the rear portion of a handle thereof so that the movement of the power mower both in a forward direction and in a turning direction may be easily and conveniently controlled by an operator of the power mower.

Another object of this invention is to provide an improved drive means for a power mower which is of such a nature whereby a single power unit may be utilized for the driving of a mower blade and for driving wheeled means of the power mower, the operation of the wheeled means being independent of the mower blade.

A further object of this invention is to provide an improved drive assembly for a power mower which includes endless tracks for moving the power mower and means for driving the endless tracks, the means being controllable from the rear end of the handle of the power mower.

A still further object of this invention is to provide an improved control means for actuating clutches of drive means of a power mower, the control means including a shiftable handle which may be selectively positioned relative to the main portion of the power mower for selectively engaging and disengaging the clutches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a top plan view of the power mower and shows the relationship of a handle thereof with respect to clutches for the drive wheel assembly, alternate positions of the handle to effect turning and driving of the power mower being shown in broken lines;

Figure 5:
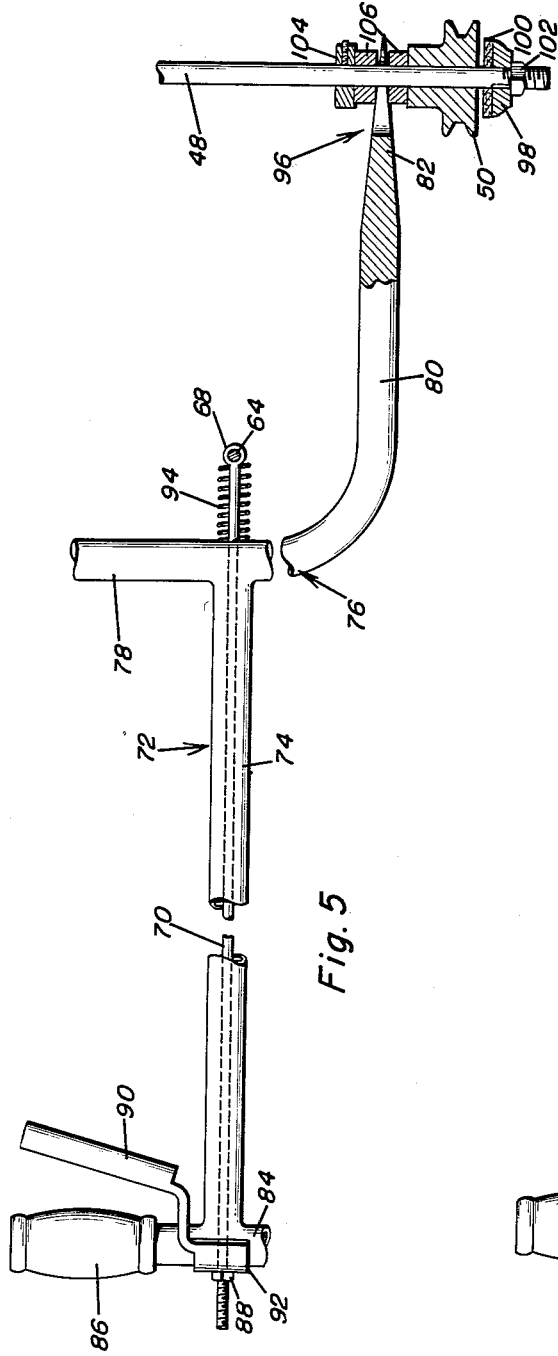
Figure 6:
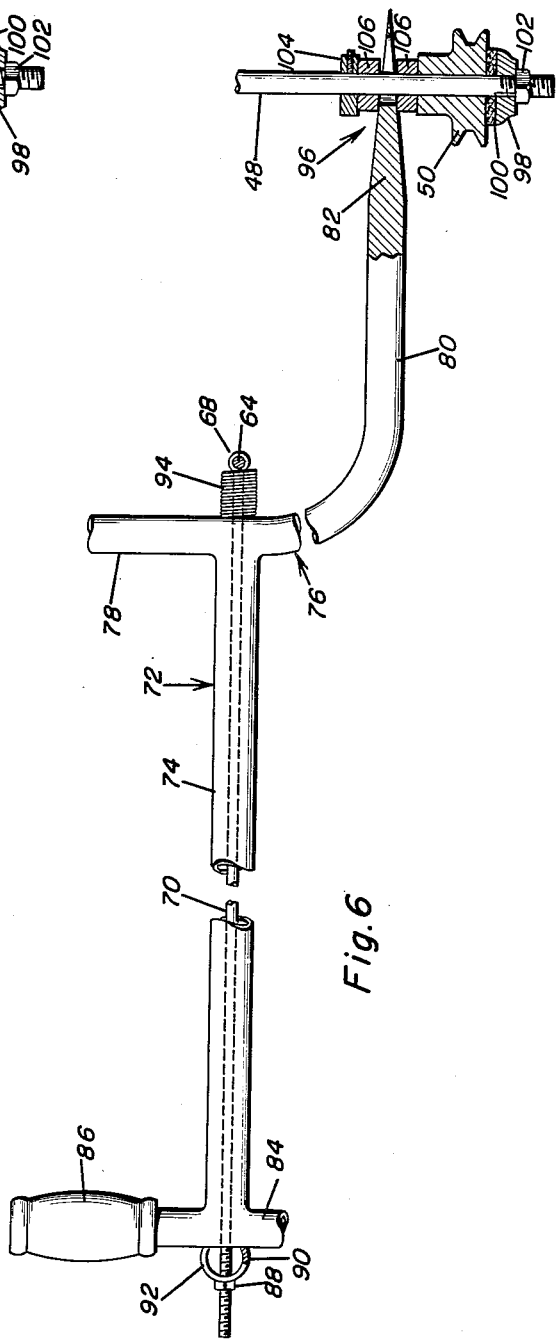

Figure 5 is an enlarged fragmentary elevational view of the handle and one of the clutch assemblies, portions of the handle being broken away and shown in section, the clutch being shown in section and other portions of the handle being broken away in order to clearly illustrate the relationship of the handle with respect to the clutch assembly, the clutch assembly being in a released or inoperative position; and Figure 6 is an enlarged fragmentary plan view similar to Figure 5 and shows the handle moved to a clutch engaging position.

Referring now to the drawings in detail, it will be seen that there is illustrated the power mower which is the subject of this invention. The power mower includes an enlarged platform 10 which has mounted thereon a power unit in the form of an internal combustion engine 12. It will be understood that the internal combustion engine 12, with the exception of those parts specifically described, is a conventional internal combustion engine and need not be explained in more detail. The internal combustion engine 12 includes a first drive shaft 14 which extends through the platform 10 and has mounted thereon a mower blade 16. The mower blade 16 is disposed below the platform 10 with the platform 10 forming a protective guard.

Figure 2:
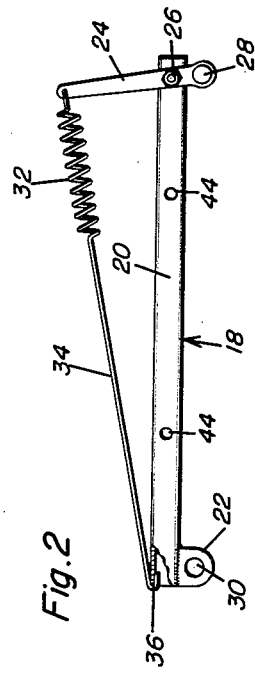
Figure 2 is a side elevational view of a mounting frame for a wheel assembly at one side of the power mower, a portion of the mounting frame being broken away and shown in section in order to clearly illustrate the details of a connection between an anchor end of a spring.

Referring now to Figure 2 in particular, it will be seen that there is illustrated a wheel mounting frame assembly which is referred to in general by the reference numeral 18. The wheel mounting frame assembly 18 includes an elongated tubular frame member 20 which has secured to the underside thereof at its rear end an ear 22. Pivotally connected to the forward end portion of the frame member 20 is an arm 24. It will be noted that the arm 24 is connected to the frame member 20 by a pivot pin 26 which extends through the arm 24 adjacent the lower end thereof. Carried by the extreme lower end of the arm 24 is an outwardly projecting axle 28. It will be noted that the axle 28 is in the same horizontal plane as an axle 30 carried by the ear 22.

Connected to the upper end of the arm 24 is one end of a coil spring 32. The coil spring 32 is provided at its rear end with an elongated extension 34. The extension 34 terminates in a hook 36 which is hooked about the rear portion of the frame member 20. It will thus be seen that the spring 32 urges the axle 28 away from the axle 30.

Figure 1:
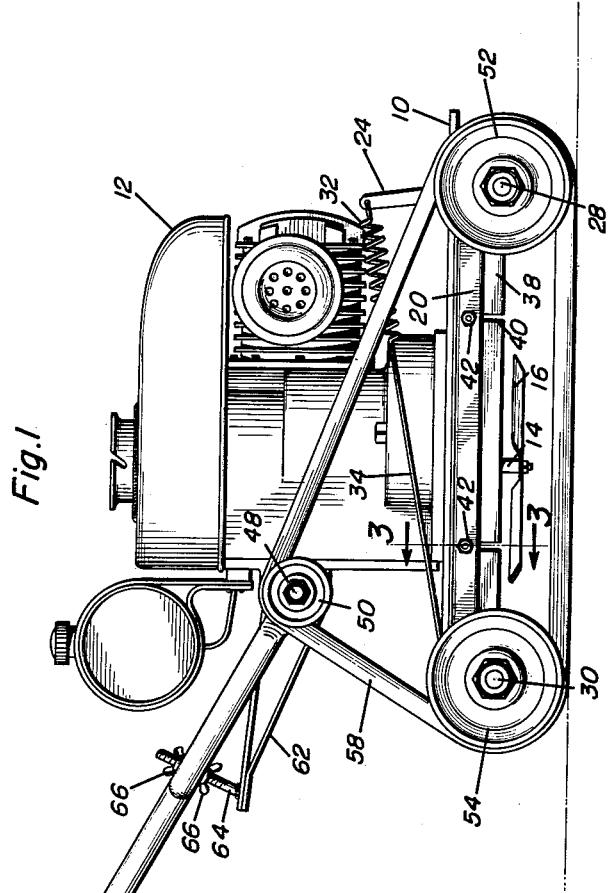
Figure 1 is a side elevational view of the power mower which is the subject of this invention and shows the general details thereof, an alternate position of the control lever for the power mower being shown in dotted lines.
Figure 3:
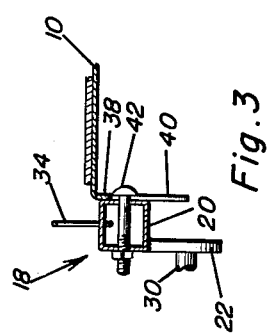
Figure 3 is an enlarged fragmentary vertical sectional view taken substantially upon the plane indicated by the section line 3—3 of Figure 1 and shows the manner in which a mounting frame for one of the wheel assemblies is vertically adjustably carried by a platform of the power mower.

Referring now to Figures 1, 2 and 3 in particular, it will be seen that the platform 10 is provided at its side edge with a depending flange 38. The depending flange 38 is provided at longitudinally spaced intervals with vertically extending slots 40. Adjustably positioned in the slots 40 are fasteners 42 which pass through openings 44 in the frame member 20 of an associated frame assembly 18. Thus, it will be seen that the fasteners 42 secure to each side of the platform 10 a frame assembly 18.

Referring now to Figures 1 and 4 in particular, it will be seen that the internal combustion engine 12 includes a rearwardly projecting housing 46 which has extending therethrough a drive shaft 48. The drive shaft 48 is disposed in transversely extending relation with respect to the platform 10 and is driven by the internal combustion engine 12. Mounted on opposite ends of the drive shaft 48 are drive pulleys 50. It may be assumed that the portions of the drive shaft 48 extending from opposite sides of the housing 46 are drive shaft portions which may or may not be, as desired, parts of a single elongated drive shaft.

Disposed at each side of the frame 10 is a forward idler wheel 52 and a rear idler wheel 54. The forward idler wheel is rotatably mounted on an associated axle 28, and the rear idler wheel 54 is mounted on an associated fixed axle 30. As is best illustrated in Figure 4, the idler wheels 52 and 54 are disposed in the same vertical plane as an associated drive pulley 50. Entrained over the idler wheels 52 and 54 and the drive pulley 50 is an endless track 58. Inasmuch as the axle 28 is urged away from the axle 30, it will be seen that the idler wheel 52 is urged forwardly to tension the endless track 58.

Extending rearwardly from the housing 46 is a pair of rearwardly converging arms 60 which are secured together at their rear ends. The arms 60 are braced by upwardly and rearwardly converging braces 62. Carried by the arms 60 at their intersection is an upwardly and slightly forwardly extending supporting shaft 64 which is externally threaded. Adjustably positioned on the supporting shaft 64 by a nut 66 is an eye 68 of an elongated control shaft 70.

Carried by the control shaft 70 is a handle for the power mower, the handle being referred to in general by the reference numeral 72. The handle 72 includes an elongated, rearwardly extending tubular portion 74 in which the control shaft 70 is received. The handle 72 also includes a bifurcated lower forward portion which is referred to in general by the reference numeral 76. The bifurcated lower forward portion 76 includes a transverse member 78 and a pair of forwardly extending legs 80. The legs 80 terminate at their free forward ends in flattened wedge-shaped portions 82. The flattened wedge-shaped portions 82 are bifurcated so as to be received about adjacent portions of the drive shaft 48, the handle 72 being pivotable about the drive shaft 48.

The handle 72 is provided at the rear end of the tubular portion 74 with a transverse member 84. The transverse member 84 is provided with a pair of grips 86.

It will be noted that the control shaft 70 extends through the transverse member 84 and that it is provided with a nut 88 threadedly engaged thereon for adjustable positioning. The nut 80 retains in place on the control shaft 70 a control lever 90.

The control lever 90 includes an arcuate cam portion 92 which normally lies in concentric relation to an adjacent portion of the transverse member 84. It will be seen that by either pivoting the control lever 90 rearwardly through the squeezing thereof towards the associated grip 86, or by rotating the control lever to a vertical position, as is best illustrated in Figure 1, the handle 72 may be moved forwardly toward the drive shaft 48. Forward movement of the handle 72 is resisted by a coil spring 94 which is carried by the control shaft 70 between the transverse portion 78 and the eye 68.

In order that rotation of the drive shaft 48 may be selectively transmitted to the drive pulleys 50, there is provided for each of the drive pulleys 50 a clutch assembly which is referred to in general by the reference numeral 96. It will be noted that each clutch assembly 96 is disposed adjacent an end of the drive shaft 48, and the clutch assemblies 96 are identical.

Referring now to Figures 5 and 6 in particular, it will be seen that each of the clutch assemblies 96 includes one of the drive pulleys 50. Each clutch assembly 96 also includes a clutch disk 98 which is mounted on the extreme end portion of the drive shaft 48 and includes a clutch disk facing 100 which is in opposed relation to a face of the drive pulley 50. The clutch disk 98 is mounted on the drive shaft 48 for rotation therewith and is retained in place by a lock nut 102 threadedly engaged on the end of the drive shaft 48. Also, rigidly carried by the drive shaft 48 is a collar 104. The collar 104 is adjustably positionable on the drive shaft 48 and is disposed on the side of the drive pulley 50 remote from the clutch disk 98.

It will be noted that the wedge-shaped portion 82 of the handle 72 which is associated with the particular clutch assembly 96 illustrated in Figures 5 and 6 is disposed intermediate the collar 104 and the drive pulley 50. Disposed on opposite sides of the wedge-shaped portion 82 is a pair of thrust bearings 106.

As is best illustrated in Figure 5, when the handle 72 is in its rearmost position due to the urgings of the spring 94, the drive pulley 50 is in spaced relation with respect to the clutch disk 98 and remains stationary despite the fact that the clutch disk 98 and the drive shaft 48 may be rotating. When the handle 72 is moved forwardly, either by pivoting the control lever 90 or rotating it to the position illustrated in Figure 6, the handle 72 moves forwardly with respect to the drive shaft 48 with the result that it becomes wedged between the collar 104 and the drive pulley 50. This results in the engagement of the drive pulley 50 with the clutch disk 98 and the resultant driving of the drive pulley 50.

It is to be understood that the control lever 90 will be pivoted when it is desired to move the power mower ahead only a relatively short distance. When it is desired to continuously run the power mower 10, the control lever 90 will be rotated to the vertical position best illustrated in Figures 1 and 6.

Inasmuch as the control shaft 70 is pivotally mounted at its forward end on the supporting shaft 64, it will be seen that the handle 72 may be rocked to the dotted line position illustrated in Figure 4. It will be readily apparent upon inspecting Figure 4 that when the handle 72 is rocked about the supporting shaft 64, one of the wedge-shaped portions 82 is moved to a clutch engaging position whereas the other wedge-shaped portion 82 is retracted. Thus, it will be seen that the endless track 58 at one side of the platform 10 will be driven, whereas the other endless track 58 will not be driven. This will result in the turning of the power mower in a direction opposite from the side of the driven endless track 58.

In addition to being forwardly movable and pivotable about the supporting shaft 48, the handle 72 is vertically adjustable through the proper positioning of the nut 66. It will be seen that by raising and lowering the nut 66, the handle 72 may be pivoted about its forward end which is retained on the drive shaft 48.

From the foregoing description of the invention, it will be seen that the driving of the power mower is independent of rotation of cutter blade 16 and that the driving of the power mower may be controlled from the rear of its handle. Further, it will be seen that the power mower may be steered through the pivoting of the handle about its supporting shaft.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies.

2. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies, said cam member being selectively rotatable and pivotable to effect movement of said handle.

3. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies, spring means carried by said control shaft urging said handle away from said clutch assemblies.

4. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies, said handle being supported by said control shaft.

5. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies, said handle being supported by said control shaft, said one end of said control shaft being pivotally mounted on a supporting shaft whereby said control shaft and said handle may be pivoted relative to said wheeled platform.

6. In a lawn mower, a wheeled platform, drive means for said wheeled platform, said drive means including a pair of drive shaft portions, a clutch assembly on each drive shaft portion, a handle carried by said wheeled platform for pivoting about a generally vertical axis and for shifting longitudinally of said platform, said handle including a bifurcated lower part having spaced legs, said legs terminating in wedge-shaped free ends forming actuators for said clutch assemblies, means carried by said handle for shifting said handle relative to said wheeled platform to selectively engage and disengage said clutch assemblies, said means including a control shaft extending through said handle, one end of said control shaft being retained relative to said wheeled platform, a lever actuated cam member carried by the other end of said control shaft for urging said handle towards said clutch assemblies, said handle being supported by said control shaft, said one end of said control shaft being pivotally mounted on a supporting shaft whereby said control shaft and said handle may be pivoted relative to said wheeled platform, said one end of said control shaft being adjustably positionable on said supporting shaft to vertically position said handle.

References Cited in the file of this patent

UNITED STATES PATENTS

| 1,270,180 | McCune | June 18, 1918 |
| 1,519,164 | Pfeiffer | Dec. 16, 1924 |
| 1,779,583 | Blydenburgh | Oct. 28, 1930 |
| 2,500,077 | Howard | Mar. 7, 1950 |
| 2,585,315 | Herman | Feb. 12, 1952 |
| 2,633,370 | Johnston et al. | Mar. 31, 1953 |